Feb. 4, 1958     A. C. FIELDS     2,822,535
HIGH VOLTAGE, DIRECT CURRENT, POWER PACKS
Filed Oct. 1, 1956
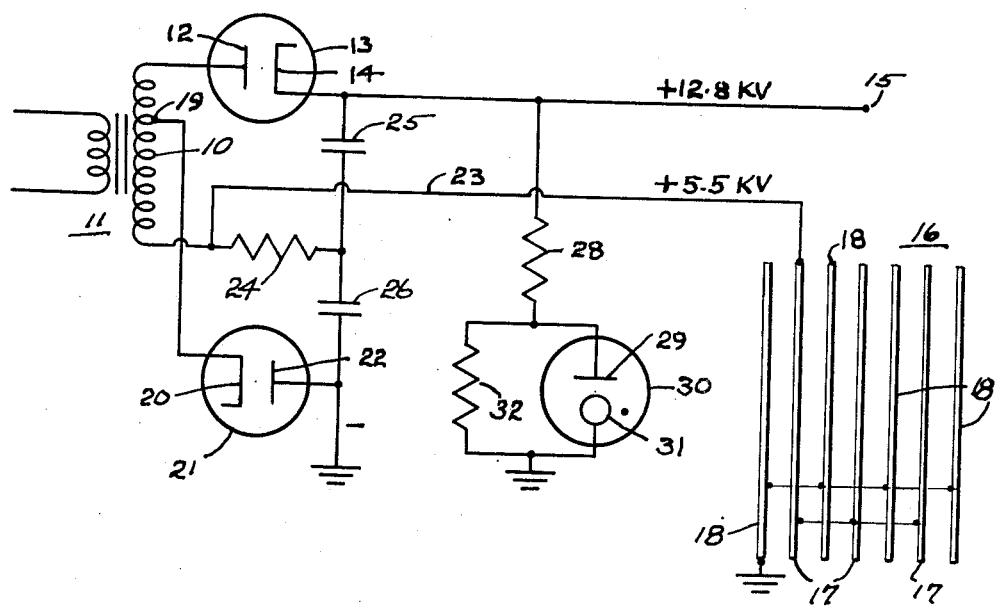
ARNOLD C. FIELDS
*INVENTOR*
BY *Robert J. Palmer*
*ATTORNEY*

United States Patent Office 2,822,535
Patented Feb. 4, 1958

2,822,535

HIGH VOLTAGE, DIRECT CURRENT, POWER PACKS

Arnold C. Fields, Medfield, Mass., assignor to Westinghouse Electric Corporation, East Pittsburgh, Pa., a corporation of Pennsylvania Application October 1, 1956, Serial No. 613,298

2 Claims. (Cl. 340—252)

This invention relates to high voltage, direct current, power packs designed particularly for energizing the ionizers and collectors of electrostatic precipitators.

Many electrostatic precipitators have ionizer wires which are charged to about +12 kv., and have collector plates, alternate ones of which are charged to about +6 kv. The power packs for energizing such ionizer wires and collector plates are usually of the voltage-doubler type having series-connected capacitors between the ionizer wire terminal and ground, with the collector plate voltage taken off through a surge resistor from the junction point of the capacitors. Such a surge resistor occasionally fails and when this happens, the collector plates are deenergized while the ionizer remains energized. This results in charged dust particles being discharged into a room where they settle by space charge precipitation, upon surfaces in the room, causing darkening of such surfaces.

This invention overcomes such a trouble by locating the surge resistor in a circuit common to both an ionizer and its associated collector. When this resistor fails, both the ionizer and collector are deenergized so that there can be no ionization without collection.

Another feature of this invention is that a single neon lamp connected to the ionizer wire terminal of the power pack and to ground, indicates when the power pack is supplying voltage to both the ionizer and the collector.

An object of this invention is to reduce the troubles caused by failures of components of high voltage, direct current power packs.

Another object of this invention is to reduce the number of components required by a high voltage, direct current power pack.

This invention will now be described with reference to the annexed drawing which is a circuit schematic of a power pack embodying this invention, connected to an ionizer wire and collector plates of an electrostatic precipitator.

A step-up transformer 11 has a secondary winding 10 connected at one end to the anode 12 of a half-wave rectifier tube 13, the cathode 14 of which is connected to an ionizer wire 15 of an electrostatic precipitator which has charge collector plates 17 and ground collector plates 18. A tap 19 on the winding 10 is connected to the cathode 20 of another half-wave rectifier tube 21, the anode 22 of which is connected to ground and to the negative terminal of the power pack. The other end of the winding 10 is connected through a conductor 23 to the charge plates 17. The other end of the winding 10 is also connected to one end of a surge resistor 24. Capacitors 25 and 26 are connected in series between the cathode 14 of the tube 13 and the anode 22 of the tube 21. The other end of the resistor 24 is connected to the junction of the capacitors 25 and 26.

A trouble indicator circuit is provided, and consists of a resistor 28 connected at one end to the cathode 14 of the tube 13, and connected at its other end to the anode 29 of a neon tube 30. The cathode 31 of the tube 30 is grounded, and the anode 29 and cathode 31 are shunted by a resistor 32.

In operation, the tubes 13 and 21 conduct during alternate half-cycles, the tube 13 charging the capacitor 25 when it conducts, and the tube 21 charging the capacitor 26 when it conducts, in the usual voltage-doubler action, a charged capacitor being in series with a conducting tube during both half-cycles, their voltages being added.

In the particular circuit illustrated by the drawing, the tap 19 on the transformer secondary winding 10 is placed to provide a +5.5 kv. voltage to the collector plates 17, and a +12.8 kv. voltage to the ionizer wire 15.

Failure of the surge resistor 24 causes the transformer secondary winding 10 to be disconnected from the voltage-doubler circuit, thus preventing the circuit from supplying ionizer wire voltage when the resistor has failed. In prior circuits, the transformer secondary windings were connected directly to the junctions of the voltage-doubler capacitors, and the surge resistors were connected between the junctions of the capacitors and the charge collector plates. Failures of such prior surge resistors, while deenergizing the charge collector plates, had no adverse effect on the ionizer.

The neon lamp 30 will light when the power pack is operating properly, and will go out when any failure occurs. It indicates when lighted, that both the ionizer and collector are energized.

What is claimed, is:

1. A voltage-doubler circuit comprising a pair of half-wave rectifiers having cathodes and anodes, a pair of capacitors connected in series to the anode of one of said rectifiers and to the cathode of the other of said rectifiers, a transformer secondary winding connected at one end to said anode of said one rectifier, said winding having a tap connected to said cathode of said other rectifier, a surge resistor connected at one end to the other end of said winding and at its other end to the junction of said capacitors, a high voltage D. C. output connection connected to said cathode of said one rectifier, an intermediate voltage D. C. output connection connected to said one end of said resistor, and a negative output connection connected to said anode of said other rectifier.

2. A voltage-doubler circuit as claimed in claim 1 in which a single gas filled trouble lamp is provided and is connected to said high voltage connection and to said negative connection.

No references cited.